US012675630B2

(12) United States Patent
Beauchamp

(10) Patent No.: US 12,675,630 B2
(45) Date of Patent: Jul. 7, 2026

(54) METHODS AND SYSTEMS FOR PROMPTING LARGE LANGUAGE MODEL TO PROCESS INPUTS FROM MULTIPLE USER ELEMENTS

(71) Applicant: Shopify Inc., Ottawa (CA)

(72) Inventor: Daniel Beauchamp, Toronto (CA)

(73) Assignee: Shopify Inc., Ottawa (CA)

( * ) Notice: Subject to any disclaimer, the term of this patent is extended or adjusted under 35 U.S.C. 154(b) by 74 days.

(21) Appl. No.: 18/186,472

(22) Filed: Mar. 20, 2023

(65) Prior Publication Data

US 2024/0256762 A1 Aug. 1, 2024

Related U.S. Application Data

(60) Provisional application No. 63/483,671, filed on Feb. 7, 2023, provisional application No. 63/482,406, filed on Jan. 31, 2023.

(51) Int. Cl.
| | |
|---|---|
| *G06F 17/00* | (2019.01) |
| *G06F 40/166* | (2020.01) |
| *G06F 40/205* | (2020.01) |
| *G06F 40/40* | (2020.01) |

(52) U.S. Cl.
CPC .......... *G06F 40/166* (2020.01); *G06F 40/205* (2020.01); *G06F 40/40* (2020.01)

(58) Field of Classification Search
CPC ....... G06F 40/166; G06F 40/205; G06F 40/40
See application file for complete search history.

(56) References Cited

U.S. PATENT DOCUMENTS

| | | |
|---|---|---|
| 11,481,545 B1 | 10/2022 | Aviles et al. |
| 2009/0265612 A1 | 10/2009 | Cheney |
| 2022/0036153 A1 | 2/2022 | O'Malia et al. |
| 2022/0108079 A1 | 4/2022 | Roisman |
| 2022/0374608 A1 | 11/2022 | Shazeer et al. |
| 2023/0112921 A1 | 4/2023 | Cai et al. |
| 2023/0237277 A1 | 7/2023 | Reza et al. |

(Continued)

FOREIGN PATENT DOCUMENTS

| | | |
|---|---|---|
| CN | 111368522 B | 1/2024 |
| CN | 118528959 A | 8/2024 |
| JP | 2024108932 A | 8/2024 |

OTHER PUBLICATIONS

Yuan, Ann, et al. "Wordcraft: story writing with large language models." Proceedings of the 27th International Conference on Intelligent User Interfaces. 2022 (Year: 2022).*

(Continued)

*Primary Examiner* — Andrew T McIntosh
(74) *Attorney, Agent, or Firm* — Smart & Biggar LP

(57) ABSTRACT

Methods and systems for prompting a large language model (LLM) to process inputs from multiple user elements to generate a revised block of text are described. One or more text-editing instructions related to respective one or more selected text portions in a block of text are received. A prompt is generated for a LLM to generate a revised block of text, the prompt including at least a portion of an annotated block of text, the annotated block of text including each text-editing instruction inserted into the block of text relative to each respective selected text portion. The prompt is provided to the LLM and a revised block of text is received and outputted.

25 Claims, 7 Drawing Sheets

(56) References Cited

U.S. PATENT DOCUMENTS

| | | | |
|---|---|---|---|
| 2023/0289515 A1* | 9/2023 | Jayaraj Devadoss | ......................... H04N 1/32144 |
| 2023/0297887 A1 | 9/2023 | Gurgu et al. | |
| 2023/0316001 A1 | 10/2023 | Araki | |
| 2024/0038226 A1 | 2/2024 | Nouri et al. | |
| 2024/0070270 A1 | 2/2024 | Mace et al. | |
| 2024/0086051 A1* | 3/2024 | Ciminelli | ................... G06F 8/38 |
| 2024/0111960 A1 | 4/2024 | Earle et al. | |
| 2024/0127617 A1* | 4/2024 | Amamou | ......... G06V 30/19133 |
| 2024/0143698 A1 | 5/2024 | Shirwadkar et al. | |
| 2024/0184812 A1 | 6/2024 | McDaniel et al. | |
| 2024/0185001 A1 | 6/2024 | Nagaraju et al. | |
| 2024/0242037 A1 | 7/2024 | Heller et al. | |
| 2024/0256423 A1 | 8/2024 | Zhang et al. | |
| 2024/0265205 A1 | 8/2024 | Goligorsky | |
| 2024/0311546 A1 | 9/2024 | Maschmeyer et al. | |

OTHER PUBLICATIONS

Wu, Tongshuang, et al. "Promptchainer: Chainging large language model prompts through visual programming." CHI Conference on Human Factors in Computing Systems Extended Abstracts. 2022 (Year: 2022).*

Canadian Intellectual Proprty Office, "International Search Report and Written Opinion" for PCT/CA2023/051099 dated Nov. 20, 2023.

Mrozewski, Tomasz, "Adding title and heading tags to a Word document", Sep. 24, 2021, OJS for YDJ, 3 pages, https://pressbooks.library.yorku.ca/ojsforydj/chapter/adding-title-heading-tages-to-a-word-document/.

* cited by examiner

700

METHODS AND SYSTEMS FOR PROMPTING LARGE LANGUAGE MODEL TO PROCESS INPUTS FROM MULTIPLE USER ELEMENTS

CROSS-REFERENCE TO RELATED APPLICATIONS

The present disclosure claims priority from U.S. provisional patent application No. 63/483,671, filed Feb. 7, 2023, entitled "METHODS AND SYSTEMS FOR PROMPTING LARGE LANGUAGE MODEL TO PROCESS INPUTS FROM MULTIPLE USER ELEMENTS", and U.S. provisional patent application No. 63/482,406, filed Jan. 31, 2023, entitled "METHODS AND SYSTEMS FOR PROMPTING LARGE LANGUAGE MODEL TO PROCESS INPUTS FROM MULTIPLE USER ELEMENTS", the entireties of which are hereby incorporated by reference.

FIELD

The present disclosure relates to machine learning, and, more particularly, to generation of prompts to large language models (LLMs), and, yet more particularly, to prompting an LLM to process inputs from multiple user elements to generate text.

BACKGROUND

A large language model (LLM) is a type of machine learning (ML) model that is capable of generating text output, including natural language text output. A LLM may be provided with a prompt, which may be a natural language instruction that instructs the LLM to generate a desired output, including natural language text or other generative output in various desired formats.

SUMMARY

Online services for revising a block of text are provided. Some such services employ machine learning (ML). In some existing machine learning (ML)-based services for revising a block of text, the user is typically limited to providing general instructions for the revision (e.g., simplifying, summarizing, expanding, rephrasing) of the entirety of the block of text. The options for what instructions can be provided for revising the text are also typically limited (e.g., restricted to choosing from a set list of possible instructions like "simplify" or "summarize") and may be unintuitive to a user.

Conventionally, ML-based text revision services do not allow the user to provide more specific stylistic instructions (e.g., "make this quirkier"). As well, conventionally, each editing instruction from the user is processed by the ML-based service in isolation, which can be inefficient and/or may result in inconsistencies in the revised text. Additionally, providing revision instructions one-by-one may result in poor model performance both in terms of speed (multiple revisions of the text need to be generated by the model) and quality (e.g., on a subsequent revision the model may rewrite a part of the text that reverses a prior editing instruction).

In various examples, the present disclosure describes a technical solution that enables one or more text-editing instructions to be included in a prompt to a large language model (LLM), to output a revised block of text. In some examples, multiple text-editing instructions may be included in a single prompt. By combining multiple editing instructions into a single prompt to the LLM, improved computational efficiency can be achieved. The LLM only needs to process the single prompt, which requires less processing power and less time compared to processing multiple prompts.

Another technical advantage is that by providing context to the editing instructions in a prompt, the LLM may generate text output that is more cohesive and relevant (e.g., in terms of style and content), because the LLM can extract more contextual information from a longer text block. Additionally, when multiple editing instructions are included in the prompt, the LLM may better satisfy the editing instructions (rather than possibly reversing a prior instruction when processing a later instruction).

User interactions may also be improved because there is only one prompt being processed and thus only one latency period to receive the revised text. The user may be able to view all the changes together.

In some examples, the present disclosure provides a text-editing user interface (UI). The UI provided for inputting text-editing instructions by the user may also be more intuitive compared to some existing ML-based text editors.

In some examples, if a block of text is too long to be inputted to the LLM as a single prompt (e.g., the maximum number of tokens accepted by the LLM would be exceeded), windowing can be used to ensure that editing instructions are provided with contextual information in a prompt to the LLM. The skilled person will recognize that a "block" of text, as used in the present disclosure, refers to a sequence of characters. Such a sequence may also be referred to as a run, a span, a paragraph, a segment, a passage, etc. A block of text may comprise one or more (sub-)blocks of text, which may themselves also be blocks of text. Additionally or alternatively, a block of text may contain formatting information (e.g. alignment, font, weight, etc.). Such formatting information may be included in the prompt or otherwise inset in the block of text (e.g. using a markup language such as HTML), may be inputted to the LLM out-of-band (e.g. via an interface that is not a prompt), may be stripped from the block of text before inputted into an LLM, and/or may be constituted or reconstituted in the block of text after it is returned from the LLM. Furthermore, the skilled person will recognize that the relationship between one group of blocks of text and another group of blocks of text may not necessarily be one-to-one. For example, the relationship between "revised" or "annotated" blocks of text and blocks of text (simpliciter) may be a one-to-many, a many-to-one, or a many-to-many relationship.

In various examples, the present disclosure describes a technical solution that may be provided by a platform (e.g., SaaS platform). The platform may serve as an interface layer between a user device and the LLM, to improve accessibility to the LLM.

In an example aspect, the present disclosure describes a computing system including a processing unit configured to execute computer-readable instructions to cause the system to: receive one or more text-editing instructions related to respective one or more selected text portions in a block of text; generate a prompt to a large language model (LLM) to generate a revised block of text, the prompt including at least a portion of an annotated block of text, the annotated block of text including each text-editing instruction inserted into the block of text relative to each respective selected text portion; provide the prompt to the LLM and receive a revised block of text; and output the revised block of text.

In an example of the preceding example system, the processing unit may be configured to execute instructions to further cause the system to: provide, to a user device, a text-editing user interface (UI) for editing the block of text, the text-editing UI enabling user input of the one or more text-editing instructions related to the one or more selected text portions; wherein the one or more text-editing instructions are received from the user device; and wherein the revised block of text is outputted to the user device.

In an example of the preceding example system, the revised block of text may be outputted for display via the text-editing UI.

In an example of any of the preceding example systems, the processing unit may be configured to execute computer-readable instructions to further cause the system to generate the prompt by: parsing the received one or more text-editing instructions to identify one text-editing instruction that is related to a respective selected text portion, the identified text-editing instruction containing a predefined keyword indicating the identified text-editing instruction should be applied elsewhere in the block of text; identifying at least one other text portion in the block of text based on a match with the respective selected text portion that is related to the identified text-editing instructions; annotating both the respective selected text portion that is related to the identified text-editing instructions and the identified at least one other text portion with the identified text-editing instruction; and including the annotated block of text in the prompt.

In an example of any of the preceding example systems, the processing unit may be configured to execute computer-readable instructions to further cause the system to: generate the prompt including at least the portion of the annotated block of text, the prompt also including an instruction to cause the LLM to further annotate the annotated block of text in accordance with at least one inserted text-editing instruction; provide the prompt to the LLM and receive a further annotated block of text; generate a further prompt to the LLM including the further annotated block of text; and provide the further prompt to the LLM and receive the revised block of text.

In an example of any of the preceding example systems, the processing unit may be configured to execute computer-readable instructions to further cause the system to generate the prompt by: selecting the portion of the annotated block of text for inclusion in the prompt, the selected portion including at least one inserted text-editing instruction and a defined amount of text preceding or following the at least one inserted text-editing instruction; and including only the selected portion of the annotated block of text in the prompt.

In an example of the preceding example system, the selected portion of the annotated block of text may be selected using a window defining a maximum number of sentences preceding the at least one inserted text-editing instruction and defining a maximum number of sentences following the at least one inserted text-editing instruction.

In an example of some of the preceding example systems, the processing unit may be configured to execute computer-readable instructions to further cause the system to: calculate an estimated token number for the annotated block of text; and responsive to the estimated token number exceeding a defined maximum token number, generate the prompt using the selecting and including.

In an example of any of the preceding example systems, the processing unit may be configured to execute computer-readable instructions to further cause the system to generate the prompt by: parsing the received one or more text-editing instructions to identify one text-editing instruction that is indicated as a high priority instruction related to a respective selected text portion; annotating the block of text to insert the high priority instruction relative to the respective selected text portion and include a defined annotation to indicate higher priority; and including the annotated block of text in the prompt.

In another example aspect, the present disclosure describes a computer-implemented method including: receiving one or more text-editing instructions related to respective one or more selected text portions in a block of text; generating a prompt to a large language model (LLM) to generate a revised block of text, the prompt including at least a portion of an annotated block of text, the annotated block of text including each text-editing instruction inserted into the block of text relative to each respective selected text portion; providing the prompt to the LLM and receive a revised block of text; and outputting the revised block of text.

In an example of the preceding example method, the method may include: providing, to a user device, a text-editing user interface (UI) for editing the block of text, the text-editing UI enabling user input of the one or more text-editing instructions related to the one or more selected text portions; wherein the one or more text-editing instructions are received from the user device; and wherein the revised block of text is outputted to the user device.

In an example of the preceding example method, the revised block of text may be outputted for display via the text-editing UI.

In an example of any of the preceding example methods, generating the prompt may include: parsing the received one or more text-editing instructions to identify one text-editing instruction that is related to a respective selected text portion, the identified text-editing instruction containing a predefined keyword indicating the identified text-editing instruction should be applied elsewhere in the block of text; identifying at least one other text portion in the block of text based on a match with the respective selected text portion that is related to the identified text-editing instructions; annotating both the respective selected text portion that is related to the identified text-editing instructions and the identified at least one other text portion with the identified text-editing instruction; and including the annotated block of text in the prompt.

In an example of any of the preceding example methods, the method may include: generating the prompt including at least the portion of the annotated block of text, the prompt also including an instruction to cause the LLM to further annotate the annotated block of text in accordance with at least one inserted text-editing instruction; providing the prompt to the LLM and receive a further annotated block of text; generating a further prompt to the LLM including the further annotated block of text; and providing the further prompt to the LLM and receive the revised block of text.

In an example of any of the preceding example methods, generating the prompt may include: selecting the portion of the annotated block of text for inclusion in the prompt, the selected portion including at least one inserted text-editing instruction and a defined amount of text preceding or following the at least one inserted text-editing instruction; and including only the selected portion of the annotated block of text in the prompt.

In an example of the preceding example method, the selected portion of the annotated block of text may be selected using a window defining a maximum number of sentences preceding the at least one inserted text-editing instruction and defining a maximum number of sentences following the at least one inserted text-editing instruction.

In an example of some of the preceding example methods, the method may include: calculating an estimated token number for the annotated block of text; and responsive to the estimated token number exceeding a defined maximum token number, generating the prompt using the selecting and including.

In an example of any of the preceding example methods, generating the prompt may include: parsing the received one or more text-editing instructions to identify one text-editing instruction that is indicated as a high priority instruction related to a respective selected text portion; annotating the block of text to insert the high priority instruction relative to the respective selected text portion and include a defined annotation to indicate higher priority; and including the annotated block of text in the prompt.

In another example aspect, the present disclosure describes a non-transitory computer readable medium storing computer-executable instructions thereon, wherein the instructions are executable by a processing unit of a system to cause the system to: receive one or more text-editing instructions related to respective one or more selected text portions in a block of text; generate a prompt to a large language model (LLM) to generate a revised block of text, the prompt including at least a portion of an annotated block of text, the annotated block of text including each text-editing instruction inserted into the block of text relative to each respective selected text portion; provide the prompt to the LLM and receive a revised block of text; and output the revised block of text.

In an example of the preceding example non-transitory computer readable medium, the instructions may be executable by the processing unit to further cause the system to: provide, to a user device, a text-editing user interface (UI) for editing the block of text, the text-editing UI enabling user input of the one or more text-editing instructions related to the one or more selected text portion; wherein the one or more text-editing instructions are received from the user device; and wherein the revised block of text is outputted to the user device.

In an example of the preceding example non-transitory computer readable medium, the revised block of text may be outputted for display via the text-editing UI.

In an example of any of the preceding example non-transitory computer readable media, the instructions may be executable by the processing unit to further cause the system to generate the prompt by: parsing the received one or more text-editing instructions to identify one text-editing instruction that is related to a respective selected text portion, the identified text-editing instruction containing a predefined keyword indicating the identified text-editing instruction should be applied elsewhere in the block of text; identifying at least one other text portion in the block of text based on a match with the respective selected text portion that is related to the identified text-editing instructions; annotating both the respective selected text portion that is related to the identified text-editing instructions and the identified at least one other text portion with the identified text-editing instruction; and including the annotated block of text in the prompt.

In an example of any of the preceding example non-transitory computer readable media, the instructions may be executable by the processing unit to further cause the system to: generate the prompt including at least the portion of the annotated block of text, the prompt also including an instruction to cause the LLM to further annotate the annotated block of text in accordance with at least one inserted text-editing instruction; provide the prompt to the LLM and receive a further annotated block of text generate a further prompt to the LLM including the further annotated block of text; and provide the further prompt to the LLM and receive the revised block of text.

In an example of any of the preceding example non-transitory computer readable media, the instructions may be executable by the processing unit to further cause the system to generate the prompt by: selecting the portion of the annotated block of text for inclusion in the prompt, the selected portion including at least one inserted text-editing instruction and a defined amount of text preceding or following the at least one inserted text-editing instruction; and including only the selected portion of the annotated block of text in the prompt.

In an example of the preceding example non-transitory computer readable medium, the selected portion of the annotated block of text may be selected using a window defining a maximum number of sentences preceding the at least one inserted text-editing instruction and defining a maximum number of sentences following the at least one inserted text-editing instruction.

In an example of some of the preceding example non-transitory computer readable media, the instructions may be executable by the processing unit to further cause the system to: calculate an estimated token number for the annotated block of text; and responsive to the estimated token number exceeding a defined maximum token number, generate the prompt using the selecting and including.

In an example of any of the preceding example non-transitory computer readable media, the instructions are executable by the processing unit to further cause the system to generate the prompt by: parsing the received one or more text-editing instructions to identify one text-editing instruction that is indicated as a high priority instruction related to a respective selected text portion; annotating the block of text to insert the high priority instruction relative to the respective selected text portion and include a defined annotation to indicate higher priority; and including the annotated block of text in the prompt.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Figure 1A:
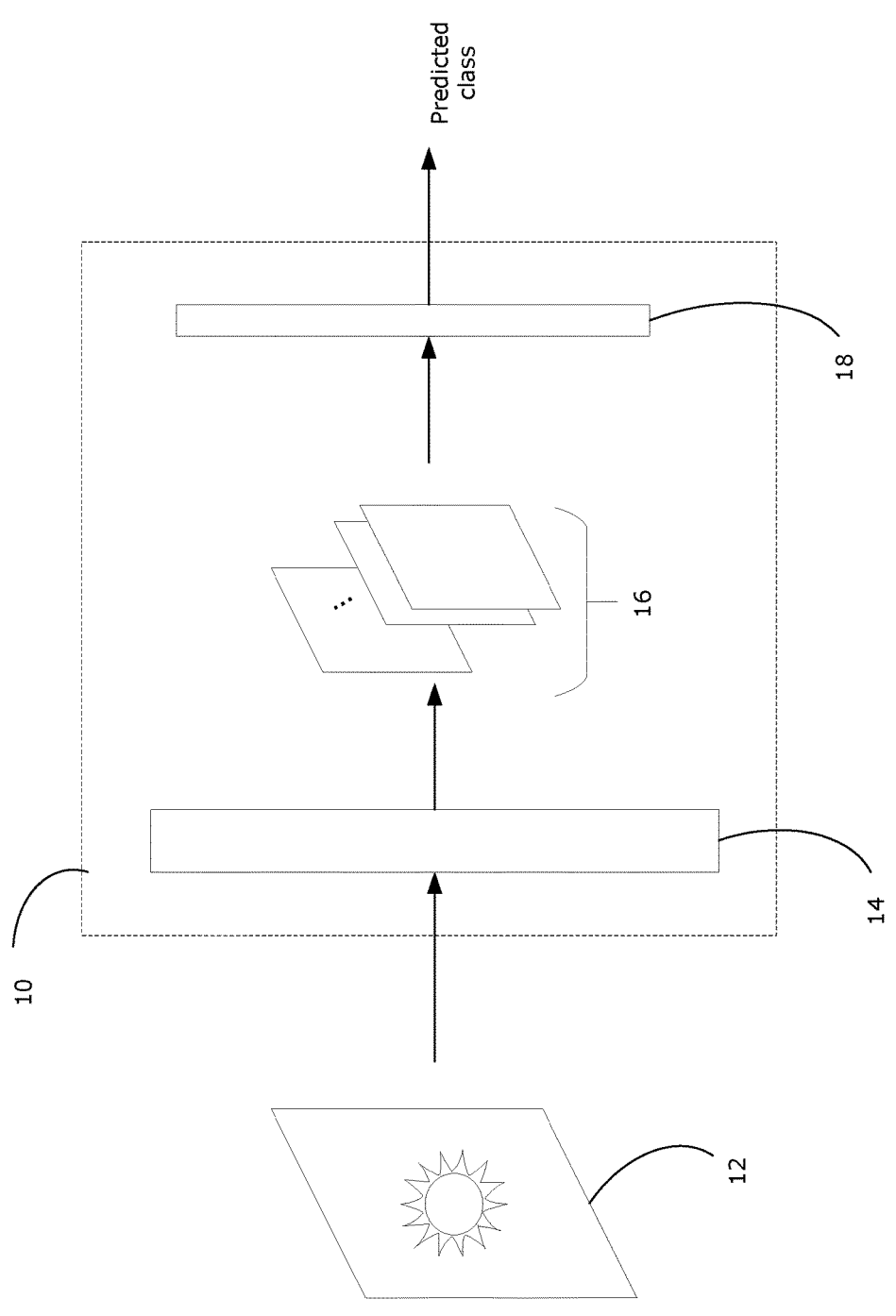
FIG. 1A is a block diagram of a simplified convolutional neural network, which may be used in examples of the present disclosure.

To assist in understanding the present disclosure, some concepts relevant to neural networks and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled. Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publically-available text corpuses may be, e.g., fine-tuned by further training using the complete works of Shakespeare as training data samples (e.g., where the intended use of the ML model is generating a scene of a play or other textual content in the style of Shakespeare).

FIG. 1A is a simplified diagram of an example CNN 10, which is an example of a DNN that is commonly used for image processing tasks such as image classification, image analysis, object segmentation, etc. An input to the CNN 10 may be a 2D RGB image 12.

The CNN 10 includes a plurality of layers that process the image 12 in order to generate an output, such as a predicted classification or predicted label for the image 12. For simplicity, only a few layers of the CNN 10 are illustrated including at least one convolutional layer 14. The convolutional layer 14 performs convolution processing, which may involve computing a dot product between the input to the convolutional layer 14 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 14 is a set of feature maps 16 (sometimes referred to as activation maps). Each feature map 16 generally has smaller width and height than the image 12. The set of feature maps 16 encode image features that may be processed by subsequent layers of the CNN 10, depending on the design and intended task for the CNN 10. In this example, a fully connected layer 18 processes the set of feature maps 16 in order to perform a classification of the image, based on the features encoded in the set of feature maps 16. The fully connected layer 18 contains learned parameters that, when applied to the set of feature maps 16, outputs a set of probabilities representing the likelihood that the image 12 belongs to each of a defined set of possible classes. The class having the highest probability may then be outputted as the predicted classification for the image 12.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 1B:
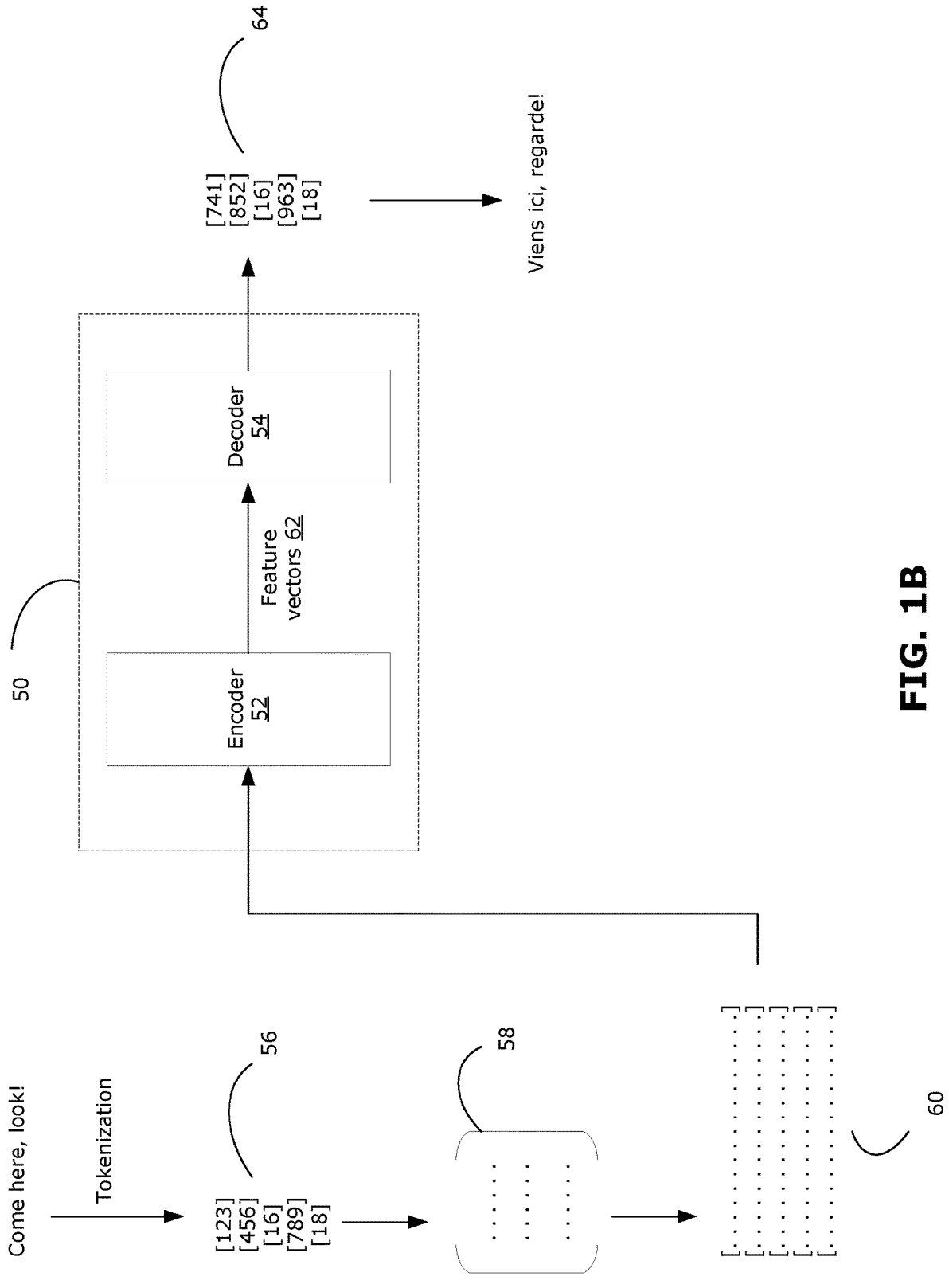
FIG. 1B is a block diagram of a simplified transformer neural network, which may be used in examples of the present disclosure.

FIG. 1B is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labelled (e.g., annotated to indicate verbs, nouns, etc.) or unlabelled. LLMs may be trained on a large unlabelled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 1B, a short sequence of tokens 56 corresponding to the text sequence "Come here, look!" is illustrated as input to the transformer 50. Tokenization of the text sequence into the tokens 56 may be performed by some pre-processing tokenization module such as, for example, a byte pair encoding tokenizer (the "pre" referring to the tokenization occurring prior to the processing of the tokenized input by the LLM), which is not shown in FIG. 1B for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 2:
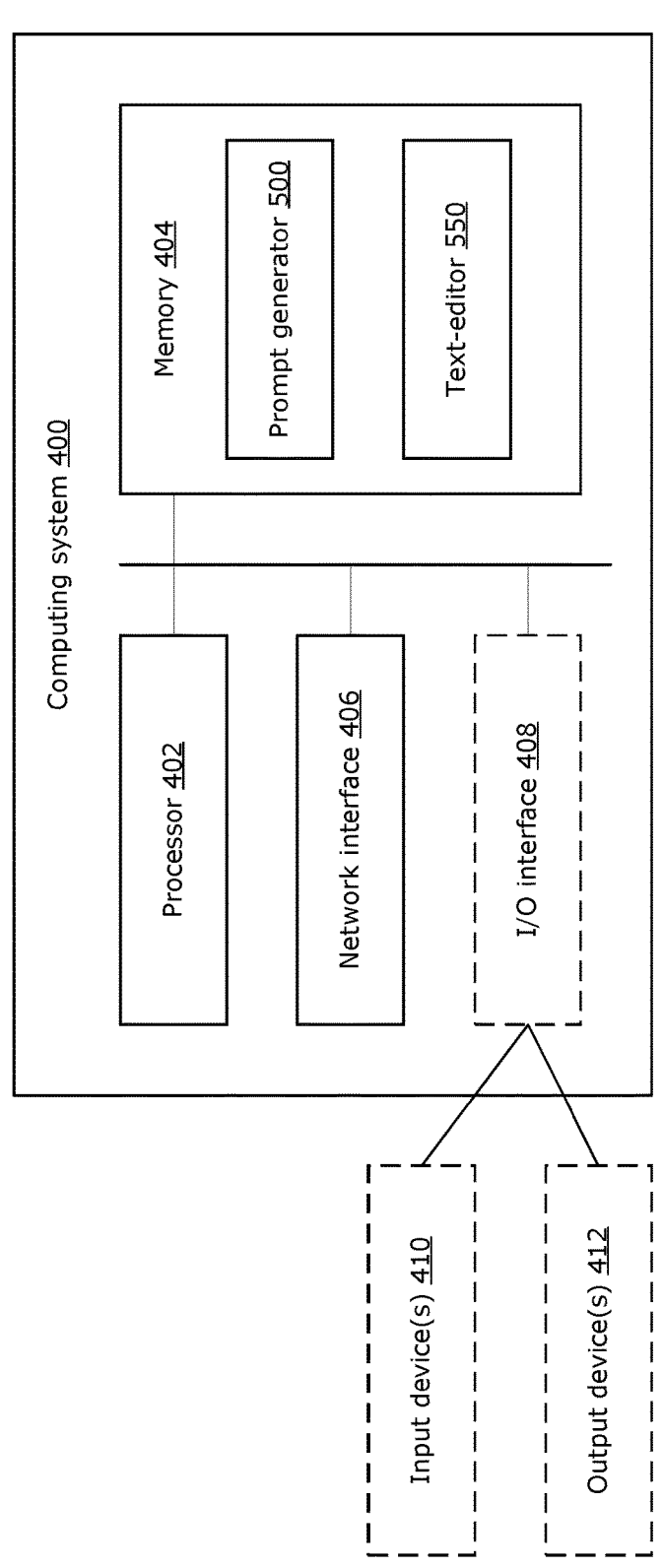
FIG. 2 is a block diagram of an example computing system, which may be used to implement examples of the present disclosure.

FIG. 2 illustrates an example computing system 400, which may be used to implement examples of the present disclosure, such as a prompt generation engine to generate prompts to be provided as input to a language model such as a LLM. Additionally or alternatively, one or more instances of the example computing system 400 may be employed to execute the LLM. For example, a plurality of instances of the example computing system 400 may cooperate to provide output using an LLM in manners as discussed above.

The example computing system 400 includes at least one processing unit, such as a processor 402, and at least one physical memory 404. The processor 402 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 404 may include a volatile or non-volatile memory (e.g., a flash memory, a random access memory (RAM), and/or a read-only memory (ROM)). The memory 404 may store instructions for execution by the processor 402, to the computing system 400 to carry out examples of the methods, functionalities, systems and modules disclosed herein.

The computing system 400 may also include at least one network interface 406 for wired and/or wireless communications with an external system and/or network (e.g., an intranet, the Internet, a P2P network, a WAN and/or a LAN). A network interface may enable the computing system 400 to carry out communications (e.g., wireless communications) with systems external to the computing system 400, such as a language model residing on a remote system.

The computing system 400 may optionally include at least one input/output (I/O) interface 408, which may interface with optional input device(s) 410 and/or optional output device(s) 412. Input device(s) 410 may include, for example, buttons, a microphone, a touchscreen, a keyboard, etc. Output device(s) 412 may include, for example, a display, a speaker, etc. In this example, optional input device(s) 410 and optional output device(s) 412 are shown external to the computing system 400. In other examples, one or more of the input device(s) 410 and/or output device(s) 412 may be an internal component of the computing system 400.

A computing system, such as the computing system 400 of FIG. 2, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

In the example of FIG. 2, the computing system 400 may store in the memory 404 computer-executable instructions, which may be executed by a processing unit such as the processor 402, to implement one or more embodiments disclosed herein. For example, the memory 404 may store instructions for implementing prompt generator 500 and/or text-editor 550 applications. In some examples, the computing system 400 may be a server of an online platform that provides the prompt generator 500 and text-editor 550 as web-based or cloud-based services that may be accessible by a user device (e.g., via communications over a wireless network). In some examples, the computing system 400 may be a user device that provides the text-editor 550 as a software application while another embodiment of the computing system 400 may be a server of the online platform that provides the prompt generator 500. Other such variations may be possible without departing from the subject matter of the present disclosure.

In various examples, the present disclosure provides methods and systems for generating a revised text using a trained LLM, in a manner that enables the LLM to process inputs from multiple user elements (e.g., multiple user-inputted editing instructions that may be inputted via a text-editing UI). In some examples, inputs from multiple user elements may be combined into a single prompt to the LLM. For longer texts, a windowing approach is used so that context is provided for each prompt.

The prompt generator 500, for example, may receive one or more text-editing instructions (e.g., communicated from a user device over a wireless network) related to respective one or more selected text portions in a block of text. For example, a user may use a text-editor (e.g., the text-editor 550 as disclosed herein and discussed further below, or another text-editor) to select portion(s) of text (or an entire text block) and provide text-editing instructions (e.g., change formatting, check for spelling errors, etc.). In particular, the present disclosure may support text-editing instructions that are more complex than changing formatting or correcting for spelling, and may support for example text-editing instructions that require changing a style, emotion or tone conveyed by the selected text. The text-editing instructions may be received from one or more users (e.g., using respective one or more user devices or identified with respective one or more user profiles). For simplicity, some examples described herein refer to text-editing instructions being received from a user device or a user, however it should be understood that text-editing instructions may be received from multiple user devices or multiple users. Additionally, the present disclosure may support text-editing instructions that are provided in natural human language rather than requiring a specific syntax or code. That is, the present disclosure may support text-editing instructions in the manner that a user may use to instruct another human. For example, the text-editing instruction(s) received by the prompt generator 500 may include a stylistic instruction in natural language such as "Make this quirkier" or "Come up with a better catchphrase". Additionally, the text-editing instruction(s) received by the prompt generator 500 may include more straightforward instructions such as "This should be underlined" or "Check the spelling of this word".

The prompt generator 500 converts the instruction(s) into one or more prompts to a LLM. For example, the prompt generator 500 may parse each instruction to extract the text of the instruction, then insert the text of each text-editing instruction as an annotation relating to the respective selected portion of text.

The prompt generator 500 may parse one or more text-editing instructions for a block of text (which may be an entire text document) to annotate the text. The annotated block of text or a portion thereof may then be included in a generated prompt. The generated prompt may further include an instruction to the LLM to generate a revised block of text in accordance with the instructions that have been annotated in the annotated block of text. The prompt may also include an instruction to enable the LLM to recognize the syntax used by the prompt generator 500 to annotate the text.

The text-editor 550 may provide a UI that enables a user to compose and/or edit a block of text (e.g., a text document). The text-editor 550 may be locally accessible on a user device of the user (e.g., may be an application on a user device such as a desktop computer, smartphone, tablet, laptop, etc.) or may be an online service, provided by an online platform, that is accessible to the user device via a communication link (e.g., over a wireless network) with the platform. If multiple users (using respective multiple user devices) are involved in composing and/or editing the text, each user may independently access the text-editor 550 (e.g., using multiple instances of the text-editor 550) and/or may independently access services provided by the text-editor 550, to independently compose and/or edit the text.

The text-editor 550 may enable a user to select a portion of text (e.g., single word, phrase, sentence, paragraph) to be revised within a larger block of text. For example, the text-editor 550 may provide a UI that enables a user to select a portion of text (e.g., using a mouse, keyboard, touchscreen, etc.), and to input (e.g., via keyboard, microphone, etc.) text-editing instructions for the selected portion of text. If text-editing instructions are provided as verbal input, a speech-to-text converter may be used to convert the verbal input into textual instructions. The user may enter any text-editing instructions including natural language instructions.

Figure 3:
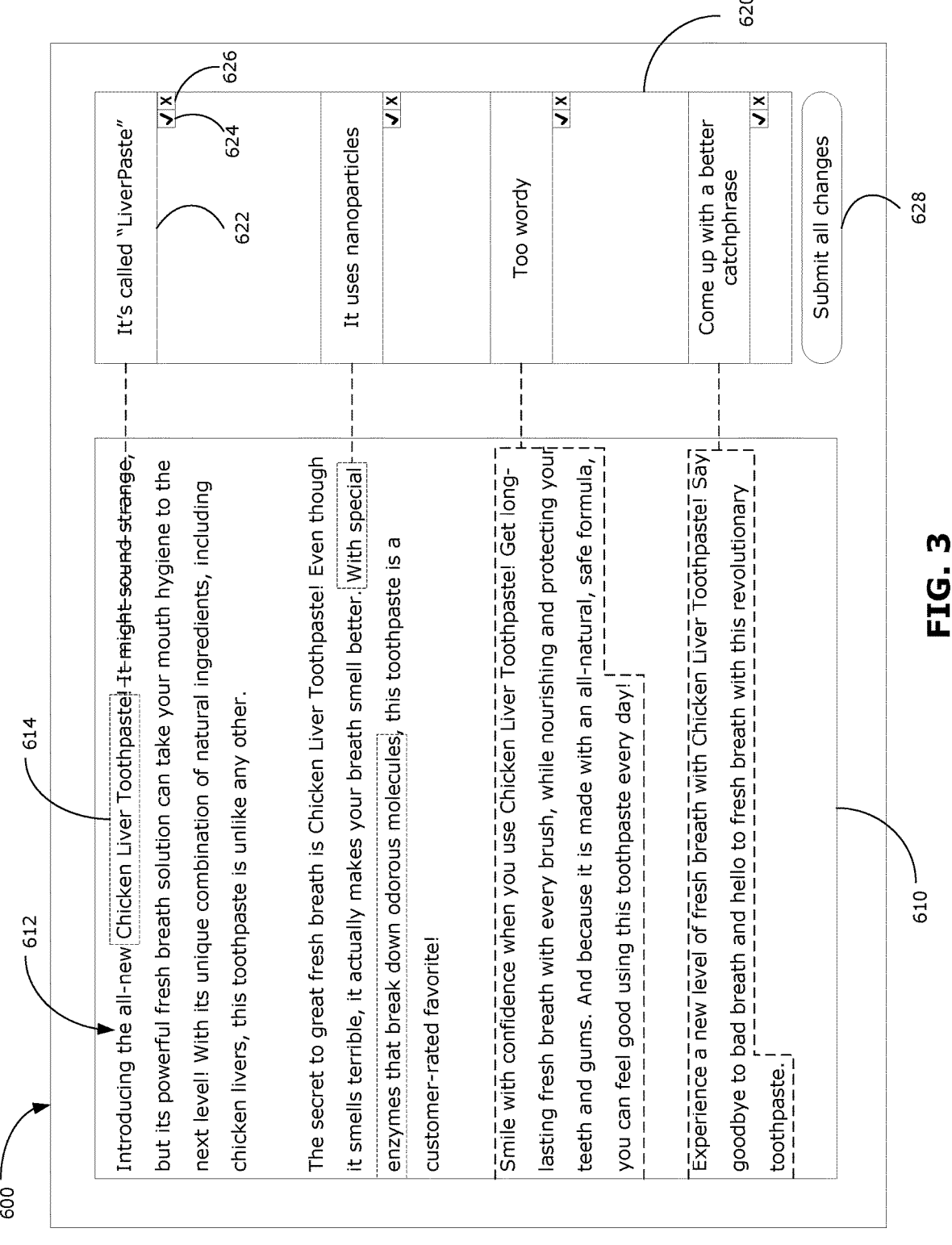
FIG. 3 is an example text-editing UI that may be provided in accordance with examples of the present disclosure.

FIG. 3 illustrates an example UI 600 that may be provided by the text-editor 550. The UI 600 may include a text input field 610 and an instruction input field 620. A block of text 612 may be inputted (e.g., manually typed, copied, imported, etc.) into the text input field 610. A portion of text 614 may be selected (as indicated by the use of dashed boxes) and a user element 622 in the instruction input field 620 may contain a user-inputted text-editing instruction corresponding to the selected portion of text 614. In this example, a dashed line is presented to visually relate the user element 622 to the corresponding selected portion of text 614. For example, a user may select the portion of text 614 (e.g., using a mouse, keyboard or touchscreen) and, with the portion of text 614 selected, may select the instruction input field 620 and input (e.g., using a keyboard) the related text-editing instruction in the user element 622. There may be multiple user elements containing text-editing instructions in the instruction input field 620 related to multiple selected portions of text in the text input field 610. Additionally, there may be multiple user elements containing text-editing instructions in the instruction input field 620 related to a single selected portion of text. In some examples, the user element 622 may include an identifier (not shown) of the user who provided the text-editing instruction in the instruction input field 620.

In this example, each user element 622 is provided with a single-instruction submit option 624 and a single-instruction cancel option 626. Selection of the single-instruction submit option 624 may cause the instruction contained in the user element 622 to be provided to the prompt generator 500 together with the corresponding selected portion of text 614 and optionally a defined amount of surrounding text (as will be discussed further below with respect to windowing). This may enable generation of a prompt to a LLM to generate a revised portion of text, in accordance with the instruction contained in the submitted user element, that the text-editor 550 may use to replace the original text in the selected portion of text 614. Selection of the single-instruction cancel option 626 may cause the selected portion of text 614 to become unselected and the user element 622 (and the text-editing instruction contained therein) to be deleted.

The UI 600 may also include a user element that is a selectable submit-all option 628. Selection of the submit-all option 628 may cause the text-editing instructions from all current user elements 622 to be provided to the prompt generator 500. For example, the text-editing instructions may be provided as data or metadata linked with the block of text 612, where each text-editing instruction is related to a corresponding selected portion of text 614.

It should be understood that the UI 600 is only exemplary and is not intended to be limiting. For example, the text-editing instructions may be provided using any other text-editing software or in other formats.

Regardless of how the text-editing instructions are provided to the prompt generator 500, the prompt generator 500 performs operations to generate a prompt to a LLM. In particular, the generated prompt includes at least a portion of an annotated block of text, where the annotated block of text is the result of annotating the original block of text with the received text-editing instructions.

For example, if the text-editing instructions and block of text as shown in FIG. 3 are received by the prompt generator 500 (e.g., in response to selection of the submit-all option 628), the prompt generator 500 may generate the following example (example 1):

> Follow the instructions embedded in the text below to revise the text to create a new one. Each instruction is given as a pair of inputs of the form: {text to revise→specific instruction on how to revise that text}. Make sure to take into account all instructions simultaneously in the generated revision.
>
> \*\*\*\*\*\*\*\*\*\*\*
>
> Text to edit:
>
> Introducing the all-new {Chicken Liver Toothpaste→It's called "LiverPaste"}! It might sound strange, but its powerful fresh breath solution can take your mouth hygiene to the next level! With its unique combination of natural ingredients, including chicken liver, this toothpaste is unlike any other. The secret to great fresh breath is Chicken Liver Toothpaste! Even though it smells terrible, it actually makes your breath smell better. {With special enzymes that break down odorous molecules→It uses nanoparticles}, this toothpaste is a customer-rated favorite!
>
> {Smile with confidence when you use Chicken Liver Toothpaste! Get long-lasting fresh breath with every brush, while nourishing and protecting your teeth and gums. And because it is made with an all-natural, safe formula, you can feel good using this toothpaste every day!→Too wordy}
>
> {Experience a new level of fresh breath with Chicken Liver Toothpaste! Say goodbye to bad breath and hello to fresh breath with this revolutionary toothpaste.→Come up with a better catchphrase}

The example prompt of example 1 may be considered to have several main parts. First, there are instructions to the LLM that provide information about the annotation syntax. This is followed by a separator (in this case, multiple asterisks) and then the annotated text that is to be revised.

Such an example prompt may be generated by the prompt generator 500 annotating the block of text 612 according to a defined syntax, such as {text to revise→text-editing instruction}. Additionally, the prompt generator 500 may append instructions to the annotated block of text that enables the LLM to understand the annotation syntax and to generate the revised block of text in accordance with the text-editing instructions.

In some examples, the prompt generator 500 may perform operations to insert additional instructions into the annotated block of text, in addition to the text-editing instruction(s) that was (were) received. For example, if a text-editing instruction to edit a particular text string is received, the prompt generator 500 may automatically annotate other instances of the same text string (which may not have any associated text-editing instruction) with the same text-editing instruction, without requiring a user to manually input the same text-editing instruction for each instance of the text string. This may provide an improved user interface and may improve efficiency and convenience by reducing the amount of inputs that need to be manually provided by a user. In some examples, to avoid propagating instructions that are intended to be applied only to a single instance of a text string, the prompt generator 500 may only automatically annotate other instances of the text string if the instruction includes keywords such as "propagate" or "do this everywhere". For example, if the text string "cat" within the block of text has a text-editing instruction "this should be dog throughout", then the prompt generator 500 may recognize the keyword "throughout" in the text-editing instruction and automatically annotate each instance of the text string "cat" with the text-editing instruction "this should be dog" (the keyword "throughout" may be omitted when the instruction is automatically propagated). Whether or not text-editing instructions should be propagated may be governed by deterministic rules implemented by the prompt generator 500. Alternatively, another machine learning model such as a classifier may be used to determine for each text-editing instruction whether or not the user likely intended the instruction to be propagated throughout the text block, or applied as a single-instruction. Such a model may be trained on labelled examples of natural human language instructions that imply propagation and others that do not. Alternatively, a LLM or other NLP model may be used, with the particular text-editing instruction as input, to determine whether or not to propagate that particular instruction throughout.

For example, if the text-editing instruction "It's called "LiverPaste"" was instead "It's called "LiverPaste" throughout", then the prompt generator 500 may recognize the keyword "throughout" and, in response, annotate each instance of the text string "Chicken Liver Toothpaste" as {Chicken Liver Toothpaste→It's called "LiverPaste"}. The generated prompt may be (example 1b):

> Introducing the all-new {Chicken Liver Toothpaste→It's called "LiverPaste"}! It might sound strange, but its powerful fresh breath solution can take your mouth hygiene to the next level! With its unique combination of natural ingredients, including chicken livers, this toothpaste is unlike any other.
>
> The secret to great fresh breath is {Chicken Liver Toothpaste→It's called "LiverPaste"}! Even though it smells terrible, it actually makes your breath smell better. {With special enzymes that break down odorous molecules→It uses nanoparticles}, this toothpaste is a customer-rated favorite!
>
> {Smile with confidence when you use {Chicken Liver Toothpaste→It's called "LiverPaste"}! Get long-lasting fresh breath with every brush, while nourishing and protecting your teeth and gums. And because it is made with an all-natural, safe formula, you can feel good using this toothpaste every day!→Too wordy}
>
> {Experience a new level of fresh breath with {Chicken Liver Toothpaste→It's called "LiverPaste"}! Say goodbye to bad breath and hello to fresh breath with this revolutionary toothpaste.→Come up with a better catchphrase}

The generated prompt may be tokenized (by a tokenizer implemented by the prompt generator 500 or by another module of the computer system) and the set of tokens may be provided as input to the LLM (e.g., via an API call). In general, the generated prompt may be sent (e.g., via an API call) to the LLM as a set of tokens or untokenized (e.g., tokenization may be performed by the LLM or a remote system). The revised text generated by the LLM may be received in response to the API call and the revised text may be outputted. For example, the revised text may be outputted to be displayed on a user device via a text-editing UI (e.g., the UI 600). For example, the revised text may be received by a computing system (e.g., a server of an online platform) and may be communicated to the user device via a communication link (e.g., over a wireless network).

For example, in response to the example prompt described above, in which the text-editing instruction "It's called "LiverPaste"" is propagated through the entire text block, the revised text that is received from the LLM may be as follows (example 2):

Introducing the all-new LiverPaste! It might sound strange, but its powerful fresh breath solution can take your mouth hygiene to the next level! With its unique combination of natural ingredients, including chicken livers, this toothpaste is unlike any other.

The secret to great fresh breath is LiverPaste! Even though it smells terrible, it actually makes your breath smell better. Through the use of revolutionary nanoparticles, this toothpaste is a customer-rated favorite!

"Spread the Word: LiverPaste, the Nutrition of the Future!"

In some examples, the prompt generator 500 may generate a series of prompts to the LLM, using a technique referred to as prompt chaining. Conceptually, prompt chaining may involve providing a series of prompts that enable the LLM to generate a desired output step-by-step. For example, the prompt generator 500 may first generate a prompt to the LLM to instruct the LLM to propagate any annotations that should be propagated.

For example, the first prompt to the LLM may be the annotated text (similar to the annotated text that follows the separator in example 1) preceded by the instructions to the LLM: "The text below includes annotations of the form: {text to revise→specific instruction on how to revise that text}. Add in the same annotation for other instances of the text to revise:". The LLM may then recognize that the annotation {Chicken Liver Toothpaste→It's called "Liver-Paste"} should be propagated throughout the text and the first output from the LLM may be the following annotated text (example 3):

Introducing the all-new {Chicken Liver Toothpaste→It's called "LiverPaste"}! It might sound strange, but its powerful fresh breath solution can take your mouth hygiene to the next level! With its unique combination of natural ingredients, including chicken livers, this toothpaste is unlike any other.

The secret to great fresh breath is {Chicken Liver Toothpaste→It's called "LiverPaste"}! Even though it smells terrible, it actually makes your breath smell better. {With special enzymes that break down odorous molecules→It uses nanoparticles}, this toothpaste is a customer-rated favorite!

{Smile with confidence when you use {Chicken Liver Toothpaste→It's called "LiverPaste"}! Get long-lasting fresh breath with every brush, while nourishing and protecting your teeth and gums. And because it is made with an all-natural, safe formula, you can feel good using this toothpaste every day!→Too wordy}

{Experience a new level of fresh breath with {Chicken Liver Toothpaste→It's called "LiverPaste"}! Say goodbye to bad breath and hello to fresh breath with this revolutionary toothpaste.→Come up with a better catchphrase}

The prompt generator 500 may include the annotated text, generated by the LLM in response to the first prompt, in a second prompt (including LLM instructions similar to the prompt of example 1) to the LLM to obtain a final revised text that is similar to the generated text of example 2.

In some examples, the text-editing instructions received by the prompt generator 500 may include a text-editing instruction that is nested within another text-editing instruction. For example, a first text-editing instruction may be related to a selected sentence, and a second text-editing instruction may be related to a selected word within the selected sentence. This means that the second text-editing instruction is nested within the first text-editing instruction. When the prompt generator 500 parses the first and second text-editing instructions, the result is a first annotation that inserts the first text-editing instruction relative to the selected sentence, and a second annotation nested within the first annotation that inserts the second text-editing instruction relative to the selected word within the sentence. The generated prompt to the LLM may include explicit LLM instructions to resolve such nested annotations in a defined way (e.g., interior annotations should be resolved before exterior annotations, following the order of operations for brackets). In some cases, nested annotations may result in the text of the interior annotation being further revised when the exterior annotation is resolved. Consider the example where the generated prompt includes the following annotated text (example 4):

{The secret to great fresh breath is {Chicken Liver Toothpaste→It's called "LiverPaste"}! Even though it smells terrible, it actually makes your breath smell better. {With special enzymes that break down odorous molecules→It uses nanoparticles}, this toothpaste is a customer-rated favorite!→don't use exaggerations}

In example 4, the annotations {Chicken Liver Toothpaste→It's called "LiverPaste"} and {With special enzymes that break down odorous molecules→It uses nanoparticles} are nested within the exterior annotation for the paragraph. Resolving the inner annotations may first result in (example 5):

{The secret to great fresh breath is LiverPaste! Even though it smells terrible, it actually makes your breath smell better. Through the use of revolutionary nanoparticles, this toothpaste is a customer-rated favorite!→don't use exaggerations}

Then resolving the outer annotation may result in the final revised text

Example 6

The secret to fresh breath is LiverPaste! Even though it smells terrible, it actually makes your breath smell better. Through the use of nanoparticles, this toothpaste is highly rated!

In this example, the first revision "Through the use of revolutionary nanoparticles" has been further revised to "Through the use of nanoparticles". Thus, nested annotations may result in the LLM revising a previously generated revised text.

Although the nested annotations have been described above as being resolved in a step-by-step sequence of revisions, the LLM may process and resolve such nested annotations in a single generated revised text.

In some examples, there may be relative priorities and/or dependencies encoded in the text-editing instructions received by the prompt generator 500. The prompt generator 500 may, for example, recognize keywords or formatting as indicators of priority (e.g., all-caps instructions or instructions in bold may indicate high-priority instructions) and may use a defined annotation (e.g., asterisks, exclamation marks, backticks, etc.) to denote higher priority instructions. The prompt generator 500 may include LLM instructions in the generated prompt to enable the LLM to recognize the syntax used to denote higher priority instructions. The LLM may process such indications of priority so that any conflicts between individual editing instructions are resolved to favor the higher-priority instruction.

For example, if one text-editing instruction for the text "Chicken Liver Toothpaste" is "It's called LiverPaste", then a subsequent text-editing instruction for the text "Chicken Liver Toothpaste" is "MAKE SURE WE CHANGE IT TO TastyPaste", the use of capitalization in the second instruction may indicate higher priority over the first instruction. The prompt generator 500 may parse these text-editing instructions and recognize the use of capitalization as indicating that the second instruction is higher priority than the first instruction. The prompt generator 500 may then generate a prompt in which the second instruction is denoted with asterisks in the annotated text and in which the LLM instructions instruct the LLM to give higher priority to the instruction denoted with asterisks. For example, the generated prompt may be (example 7):

Follow the instructions embedded in the text below to revise the text to create a new one. Each instruction is given as a pair of inputs of the form: {text to revise→specific instruction on how to revise that text}. Make sure to prioritize any instruction enclosed within asterisks.

\*\*\*\*\*\*\*\*\*\*\*

Text to edit:

Introducing the all-new {Chicken Liver Toothpaste→It's called "LiverPaste"}! It might sound strange, but its powerful fresh breath solution can take your mouth hygiene to the next level! With its unique combination of natural ingredients, including chicken livers, this toothpaste is unlike any other.

The secret to great fresh breath is {Chicken Liver Toothpaste→\*MAKE SURE WE CHANGE IT TO TastyPaste\*}! Even though it smells terrible, it actually makes your breath smell better. {With special enzymes that break down odorous molecules→It uses nanoparticles}, this toothpaste is a customer-rated favorite!

The LLM may then understand that the instruction contained in the annotation with asterisks, i.e., {Chicken Liver Toothpaste→\*MAKE SURE WE CHANGE IT TO TastyPaste\*} should be prioritized over the prior annotation {Chicken Liver Toothpaste→It's called "LiverPaste"}. Accordingly, the revised text generated by the LLM may revise all instances of "Chicken Liver Toothpaste" to "TastyPaste" (instead of "LiverPaste").

In other examples, the priority of instructions may not be explicitly indicated in the annotated text. For example, the capability to prioritize some editing instructions over others may be a capability of the LLM itself (e.g., the LLM may be trained to recognize that all-caps or bolding indicates high importance instructions).

In some examples, indications of priority may be based on metadata of the text-editing instructions. For example, each text-editing instruction in the text-editor 550 may be associated with a respective timestamp. A text-editing instruction having a later timestamp may be prioritized over a text-editing instruction having an earlier timestamp. The prompt generator 500 may, for example, order the text-editing instructions by the associated timestamps (e.g., from most recent to least recent timestamp) and include LLM instructions in the generated prompt to enable the LLM to prioritize the text-editing instructions according to the order by timestamps. In another example, the prompt generator 500 include a priority indicator for each text-editing instruction in the annotated text. For example, the prompt generator 500 may insert an annotation {Chicken Liver Toothpaste→MAKE SURE WE CHANGE IT TO TastyPaste; High priority} or {Chicken Liver Toothpaste→MAKE SURE WE CHANGE IT TO TastyPaste; Priority 1} where "High priority" or "Priority 1" is included in the annotation based on the text-editing instruction having a high priority based on the associated timestamp. Other ways of indicating priority in the annotation may be used.

In some examples, text-editing instructions may be prioritized by the prompt generator 500 based on other types of metadata of the text-editing instructions, such as an identifier of the user who inputted each text-editing instruction. If there are text-editing instructions inputted by different users, the prompt generator 500 may determine that the user identified as the original author of the text should be prioritized over other users. In another example, the metadata of the text-editing instructions may indicate the relative authority of different users who inputted text-editing instructions (e.g., users may be ranked by employer-employee hierarchy, seniority, etc.). The prompt generator 500 may then assign relative priorities to each user, based on their relative authorities. Then the prompt generator 500 may add relative priorities to the annotations, as indicated above. Alternatively or additionally, the prompt generator 500 may include the user identifier for each text-editing instruction inserted in the annotated text for example {Chicken Liver Toothpaste→MAKE SURE WE CHANGE IT TO TastyPaste; author user1}, and further include an LLM instruction in the generated prompt to always prioritize text-editing instructions from user1. The prompt generator 500 may perform other operations to determine the relative priorities of different text-editing instructions from different users and may indicate priority in the annotation in various ways.

In some cases, the text to be revised may exceed the maximum number of tokens that can be inputted to the LLM in a single prompt. For example, existing LLMs such as GPT-3 may have a maximum limit of 2048 tokens, and the text to be revised may be a document having hundreds of thousands of words (and thus would be tokenized into hundreds of thousands, or millions of tokens).

If the text, when tokenized, exceeds the maximum number of tokens, the prompt generator 500 may instead generate a prompt that includes a defined "window" of text around a text-editing instruction. For example, the prompt may be generated to include three sentences of text before and three sentences of text following the sentence that has a related text-editing instruction. In another example, the prompt may be generated to include at least two text-editing instructions and all intervening text between the two text-editing instructions. This windowing may help to ensure that the prompt provided to the LLM provides contextual information to enable the LLM to generate a more cohesive edited text. In some examples, the defined window of text may be only the selected portion(s) of text annotated with the corresponding text-editing instruction(s). Each prompt may include a single selected portion of text and the corresponding text-editing instruction, or may include multiple selected portions of text and corresponding text-editing instructions. It should be noted that in the example where a prompt includes multiple selected portions of text and corresponding text-editing instructions, any intervening text (i.e., non-selected portions of text) between selected portions of text may be omitted from the prompt.

Although the prompt of example 1 may not exceed the maximum number of tokens that would be accepted as input to a LLM, windowing may be illustrated using example 1, for simplicity and ease of understanding.

Instead of providing the entire annotated text as shown in example 1, windowing may be performed by the prompt generator 500 such that the generated prompt only includes a portion of the annotated text, such as a defined number of sentences (e.g., two sentences) before and/or after a text-editing instruction. For example, the generated prompt may be (example 8):

Follow the instructions embedded in the text below to revise the text to create a new one. Each instruction is given as a pair of inputs of the form: {text to revise→specific instruction on how to revise that text}.

\*\*\*\*\*\*\*\*\*\*\*\*

Text to edit:

The secret to great fresh breath is Chicken Liver Toothpaste! Even though it smells terrible, it actually makes your breath smell better. {With special enzymes that break down odorous molecules→It uses nanoparticles}, this toothpaste is a customer-rated favorite! Smile with confidence when you use Chicken Liver Toothpaste! Get long-lasting fresh breath with every brush, while nourishing and protecting your teeth and gums.

When windowing is used, the generated revised text portion received from the LLM in response to the prompt may replace only a portion of the original text rather than the entire text. For example, the text-editor 550 may track which portion of text has been windowed and may replace only the windowed portion of text with the generated revised text. The text-editor 550 may assemble the revised text portions together to obtain a single revised text, which may then be outputted to the user device (e.g., for display via the UI 600).

Figure 4:
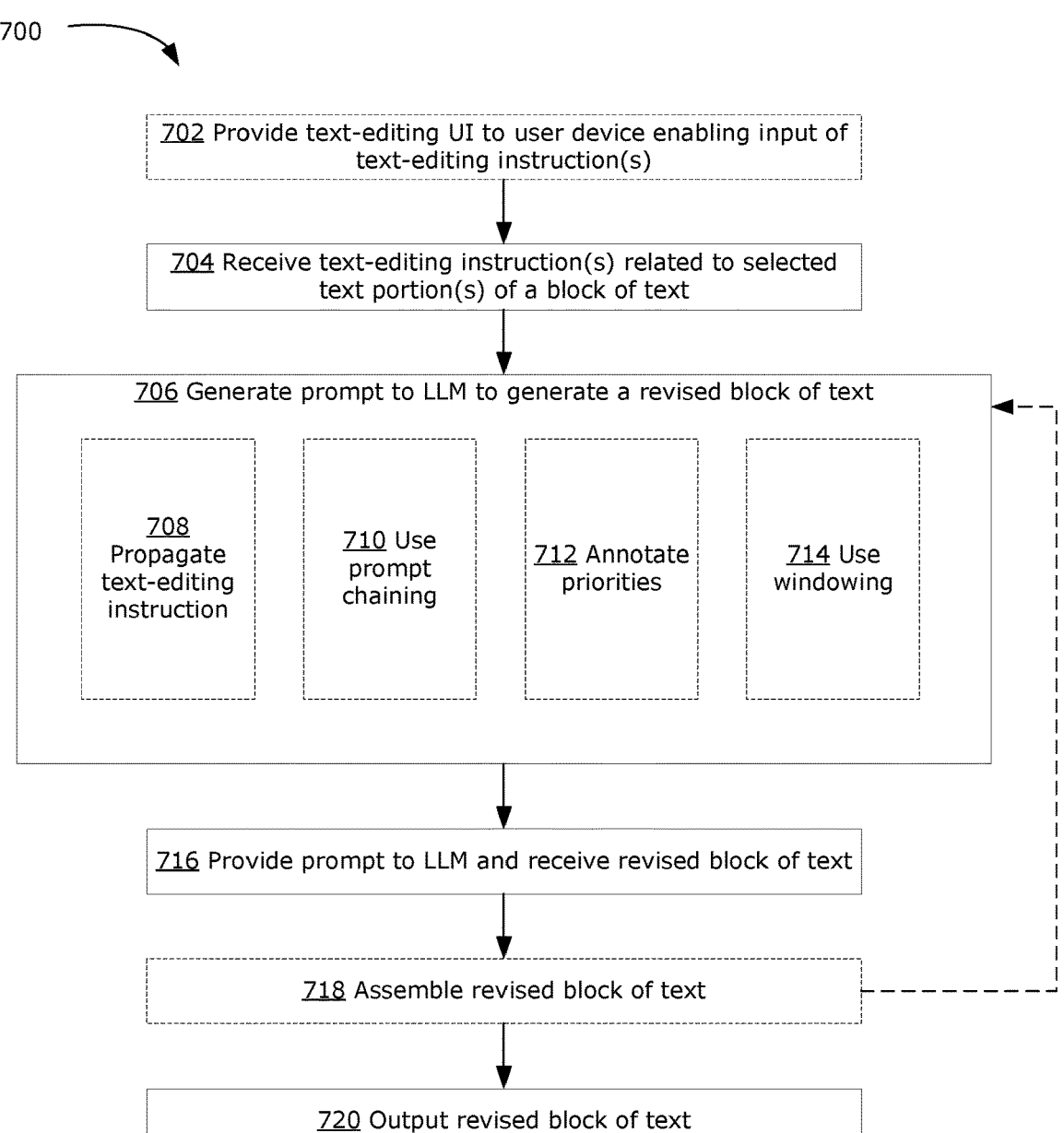
FIG. 4 is a flowchart illustrating an example method for prompting a LLM, in accordance with examples of the present disclosure.

FIG. 4 is a flowchart of an example method 700 which may be performed by a computing system, in accordance with examples of the present disclosure. For example, a processing unit of a computing system (e.g., the processor 402 of the computing system 400 of FIG. 2) may execute instructions (e.g., instructions of the prompt generator 500 and/or text-editor 550) to cause the computing system to carry out the example method 700. The method 700 may, for example, be implemented by an online platform or a server.

Optionally, at an operation 702, a text-editing UI (e.g., the UI 600) may be provided to a user device for editing a block of text. The text-editing UI may enable user input of one or more text-editing instructions related to one or more selected text portions.

At an operation 704, one or more text-editing instructions are received (e.g., by the prompt generator 500) related to respective one or more selected text portions in the block of text. In some examples, the text-editing instructions may be received from a user device (e.g., via user interaction with a text-editing UI).

At an operation 706, a prompt to a LLM is generated (e.g., by the prompt generator 500). The LLM (which may be a generative pre-trained transformer LLM, such as GPT-3 or ChatGPT) is prompted to generate a revised block of text. The prompt includes at least a portion of an annotated block of text that includes at least one text-editing instruction inserted related to a respective selected text portion. The operation 706 may be carried out in various ways. For example, the operation 706 may be carried out using one or more of optional operations 708-714. Any one or more (or none) of the optional operations 708-714 may be performed, in any suitable order and in any suitable combination. The optional operations 708-712 describe optional operations for generating the annotated block of text, at least a portion of which may be included in the generated prompt. The optional operation 714 describes an optional windowing for selecting a portion of the annotated block of text to include in the generated prompt.

At the optional operation 708, the annotated block of text may be generated by propagating a text-editing instruction through the original block of text. The received text-editing instruction(s) may be parsed (e.g., by the prompt generator 500) to identify one text-editing instruction that is related to a respective selected text portion, where the identified text-editing instruction containing a predefined keyword (e.g., "everywhere", "throughout", etc.) indicating the identified text-editing instruction should be applied elsewhere in the block of text. At least one other text portion in the block of text may be identified based on a match with the respective selected text portion that is related to the identified text-editing instructions. Then the respective selected text portion that is related to the identified text-editing instructions and the identified at least one other text portion may both be annotated with the identified text-editing instruction, and the annotated text may be included in the generated prompt.

At the optional operation 710, prompt chaining may be used to prompt the LLM to generate the revised text. The generated prompt (e.g., generated by the prompt generator 500) may include at least a portion of the annotated block of text. The generated prompt may also include an instruction to cause the LLM to further annotate the annotated block of text in accordance with at least one inserted text-editing instruction. The LLM may, in response to this prompt, generate a further annotated block of text (e.g., that propagates text-editing instructions through the entire block of text). A further prompt may be generated (e.g., by the prompt generator 500) including the further annotated block of text.

At the optional operation 712, the annotated block of text may be annotated to indicate relative priority(ies) of text-editing instruction(s). The text-editing instruction(s) may be parsed (e.g., by the prompt generator 500) to identify one text-editing instruction that is indicated as a high priority instruction (e.g., indicated by the use of capitalization, exclamation marks, bold formatting, keywords such as "make sure", etc.) related to a respective selected text portion. The block of text may then be annotated (e.g., by the prompt generator 500) to insert the high priority instruction relative to the respective selected text portion and also include a defined annotation (e.g., \*) to indicate higher priority. The annotated block of text may then be included in the generated prompt.

At the optional operation 714, windowing may be used to select a portion of annotated text to include in the generated prompt. In some examples, the operation 714 may be performed if, based on a calculated estimate of the number of tokens that would result from an annotated block of text, the estimated number of tokens would exceed a defined maximum number of tokens (e.g., exceed the maximum number of tokens that a LLM can accept as input). Windowing may be performed by selecting a portion of the annotated block that includes at least one inserted text-editing instruction and a defined amount of text preceding or following the at least one inserted text-editing instruction (e.g., a defined maximum number of sentences preceding and/or following the text-editing instruction). Then the generated prompt may include only the selected portion of the annotated block of text.

Regardless of how the operation 706 is carried out, following the operation 706 the method 700 proceeds to an operation 716.

At the operation 716, the generated prompt is provided to the LLM (e.g., via an API call to a remote LLM). For example, the generated prompt may be converted to a set of tokens (e.g., using a suitable tokenization algorithm or software). For example, the prompt may be segmented into a sequence of text segments and each text segment may be converted to a NLP token (e.g., using a token lookup) while preserving the sequential order of the text segments. Then the set of tokens may be provided to the LLM (e.g., via an API call) in sequential order. A revised block of text may then be received in response to the API call. If only a portion of the annotated block of text was included in the prompt to the LLM, a portion of a revised block of text may be received.

Optionally, an operation 718 may be performed if windowing was performed. At the optional operation 718, a revised block of text may be assembled from the received portion of revised text. For example, the received portion of revised text may be used to replace a corresponding portion of text in the larger annotated block of text. If there are additional annotations remaining, the method 700 may return to the operation 706 to prompt the LLM to generate another portion of revised text. In this way, a revised block of text may be assembled from multiple prompts generated from portions of a large annotated block of text (which, when tokenized, may exceed the maximum number of tokens accepted by the LLM).

At an operation 720, the revised block of text is outputted. Optionally, the revised block of text may be outputted to a user device. For example, if a text-editing UI (e.g., the UI 600) was provided via the user device to enable input of text-editing instruction(s), the revised block of text may be outputted to the user device to be displayed via the text-editing UI.

In some examples, one or more steps of the method 700 may be repeated to generate the final revised block of text. The prompt generator 500 may insert LLM instructions that instruct the LLM to include questions or requests in a clearly indicated preamble (e.g., the prompt may include the instruction "If you have any questions, ask them in a separate section labeled PREAMBLE"). For example, an initial revised block of text generated by the LLM may include a request for further instructions or clarification. Consider the example where a text-editing instruction inadvertently included a spelling error (e.g., a user inputs the instruction to replace "fat" with "obees", where "obees" is a spelling error of "obese"). The LLM may recognize that the text-editing instruction contains a spelling error and thus the generated revised text may include a preamble that includes request for clarification, such as "I think you meant "obese" instead of "obees"". The text-editor 550 may parse the revised block of text to identify whether there is any content in a preamble section. If there is, the text-editor 550 may extract the content of the preamble and output the content of the preamble to be reviewed by the user. This may prompt the user to revise or provide further text-editing instructions, which may then be further processed (e.g., in a manner similar to that described above) to obtain a final revised block of text. Thus, the method 700 may be performed with one or more steps being repeated or iterated multiple times, possibly with text-editing instructions being added and/or clarified by user input in each iteration, until a final revised block of text is obtained. In some examples, to avoid or reduce the number of iterations, the prompt generator 500 may use a separate NLP model (which may or may not be a LLM) to analyze the text-editing instructions for any errors, inconsistencies or lack of clarity. This analysis may enable a user to refine the text-editing instructions prior to being provided in a prompt to the LLM.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 5:
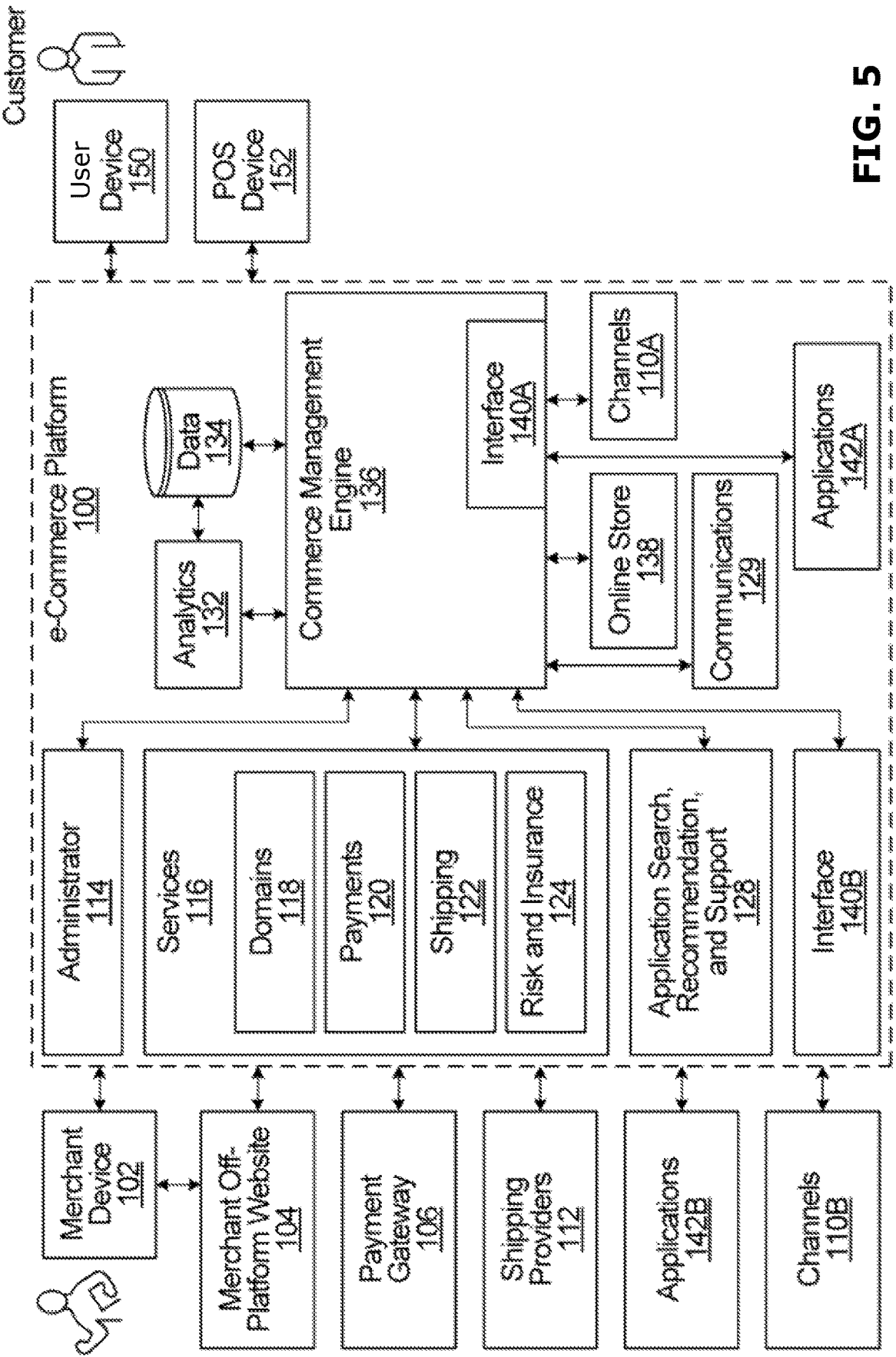
FIG. 5 is a block diagram of an example e-commerce platform, which may be an example implementation of the examples disclosed herein.

FIG. 5 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 5, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application)

connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 6:
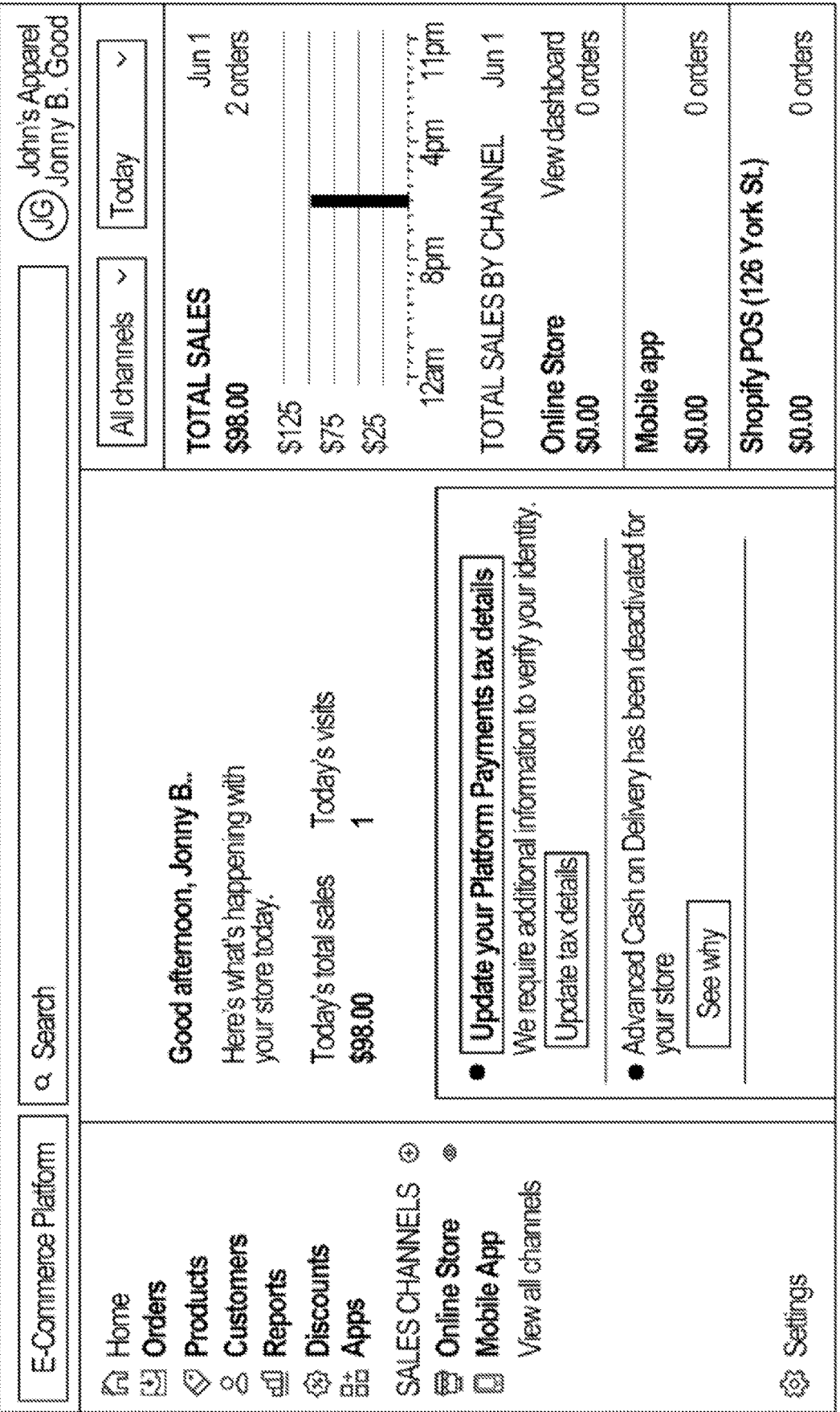
FIG. 6 is an example homepage of an administrator, which may be accessed via the e-commerce platform of FIG. 5.

FIG. 6 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalogue, managing orders, and/or the like. In some embodiments, the merchant may be able to access the different sections of the administrator 114 by using a sidebar, such as the one shown on FIG. 3. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 2, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales) (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

In some examples, the applications 142A-B may include an application that enables a user interface (UI) to be displayed on the customer device 150. In particular, the e-commerce platform 100 may provide functionality to enable content associated with an online store 138 to be displayed on the customer device 150 via a UI.

The methods and systems (e.g., prompt generator 500 and/or text-editor 550) as disclosed herein may be provided by the e-commerce platform as an online service to enable a user to conveniently and efficiently revise a block of text (e.g., for revising a product description or for revising text for a page of an online store). It should be understood that the methods and systems disclosed herein may be provided as an online service by any other online platform (e.g., SaaS platform) without being limited to the e-commerce platform. The online platform may provide applications that serve as an interface layer between the user and the LLM, to enable the user to more effectively and efficiently make use of the LLM to generate revised text.

Examples of the present disclosure may enable text-editing instructions to be provided to a LLM, in the form of a prompt, without requiring extensive input from a human user. For example, it may be possible for multiple text-editing instructions (which may be contained in multiple different user elements of a UI) from a user to be provided in a prompt to the LLM in response to a single selection of a user element (e.g., selection of a submit-all option), rather than requiring each text-editing instruction to be submitted one-by-one or prompted to the LLM one-by-one. Generation of a prompt to the LLM, which includes one or more text-editing instructions from one or more user elements, may be automated and the need for user inputs may be minimized.

Although the present disclosure has described a LLM in various examples, it should be understood that the LLM may be any suitable language model (e.g., including LLMs such as GPT-3 or ChatGPT, as well as other language models such as BART, among others). Additionally, it should be understood that the present disclosure is not limited to any particular language. Although English has been used in various examples, the present disclosure may be equally applicable to other human languages.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A system comprising a processing unit configured to execute computer-readable instructions to cause the system to:
   receive two or more text-editing instructions related to one or more selected text portions in a block of text;
   generate a prompt to a large language model (LLM) to generate a revised block of text, the prompt to the LLM including at least a portion of an annotated block of text, the annotated block of text including each text-editing instruction of the two or more text-editing instructions inserted into the block of text relative to each respective selected text portion of the one or more selected text portions;
   provide the prompt to the LLM and receive a revised block of text; and
   output the revised block of text.

2. The system of claim 1, wherein the processing unit is configured to execute instructions to further cause the system to:
   provide, to a user device, a text-editing user interface (UI) for editing the block of text, the text-editing UI enabling user input of the two or more text-editing instructions related to the one or more selected text portions;
   wherein the two or more text-editing instructions are received from the user device; and
   wherein the revised block of text is outputted to the user device.

3. The system of claim 2, wherein the revised block of text is outputted for display via the text-editing UI.

4. The system of claim 1, wherein the processing unit is configured to execute computer-readable instructions to further cause the system to generate the prompt to the LLM by:
   parsing the received two or more text-editing instructions to identify one text-editing instruction that is related to a respective selected text portion, the identified text-editing instruction containing a predefined keyword indicating the identified text-editing instruction should be applied elsewhere in the block of text;
   identifying at least one other text portion in the block of text based on a match with the respective selected text portion that is related to the identified text-editing instructions;
   annotating both the respective selected text portion that is related to the identified text-editing instructions and the identified at least one other text portion with the identified text-editing instruction; and
   including the annotated block of text in the prompt to the LLM.

5. The system of claim 1 wherein the processing unit is configured to execute computer-readable instructions to further cause the system to:
   generate the prompt to the LLM including at least the portion of the annotated block of text, the prompt to the LLM also including an instruction to cause the LLM to further annotate the annotated block of text in accordance with at least one inserted text-editing instruction;
   provide the prompt to the LLM and receive a further annotated block of text;
   generate a further prompt to the LLM including the further annotated block of text; and
   provide the further prompt to the LLM and receive the revised block of text.

6. The system of claim 1, wherein the processing unit is configured to execute computer-readable instructions to further cause the system to generate the prompt to the LLM by:
   selecting the portion of the annotated block of text for inclusion in the prompt to the LLM, the selected portion including at least one inserted text-editing instruction and a defined amount of text preceding or following the at least one inserted text-editing instruction; and
   including only the selected portion of the annotated block of text in the prompt to the LLM.

7. The system of claim 6, wherein the selected portion of the annotated block of text is selected using a window defining a maximum number of sentences preceding the at least one inserted text-editing instruction and defining a maximum number of sentences following the at least one inserted text-editing instruction.

8. The system of claim 6, wherein the processing unit is configured to execute computer-readable instructions to further cause the system to:
   calculate an estimated token number for the annotated block of text; and
   responsive to the estimated token number exceeding a defined maximum token number, generate the prompt to the LLM using the selecting and including.

9. The system of claim 1, wherein the processing unit is configured to execute computer-readable instructions to further cause the system to generate the prompt to the LLM by:
   parsing the received two or more text-editing instructions to identify one text-editing instruction that is indicated as a high priority instruction related to a respective selected text portion;
   annotating the block of text to insert the high priority instruction relative to the respective selected text portion and include a defined annotation to indicate higher priority; and
   including the annotated block of text in the prompt to the LLM.

10. A method comprising:

receiving two or more text-editing instructions related to one or more selected text portions in a block of text;

generating a prompt to a large language model (LLM) to generate a revised block of text, the prompt to the LLM including at least a portion of an annotated block of text, the annotated block of text including each text-editing instruction of the two or more text-editing instructions inserted into the block of text relative to each respective selected text portion of the one or more selected text portions;

providing the prompt to the LLM and receiving a revised block of text; and outputting the revised block of text.

11. The method of claim 10, further comprising:

providing, to a user device, a text-editing user interface (UI) for editing the block of text, the text-editing UI enabling user input of the two or more text-editing instructions related to the one or more selected text portions;

wherein the two or more text-editing instructions are received from the user device; and wherein the revised block of text is outputted to the user device.

12. The method of claim 11, wherein the revised block of text is outputted for display via the text-editing UI.

13. The method of claim 10, wherein generating the prompt to the LLM comprises:

parsing the received two or more text-editing instructions to identify one text-editing instruction that is related to a respective selected text portion, the identified text-editing instruction containing a predefined keyword indicating the identified text-editing instruction should be applied elsewhere in the block of text;

identifying at least one other text portion in the block of text based on a match with the respective selected text portion that is related to the identified text-editing instructions;

annotating both the respective selected text portion that is related to the identified text-editing instructions and the identified at least one other text portion with the identified text-editing instruction; and including the annotated block of text in the prompt to the LLM.

14. The method of claim 10, further comprising:

generating the prompt to the LLM including at least the portion of the annotated block of text, the prompt to the LLM also including an instruction to cause the LLM to further annotate the annotated block of text in accordance with at least one inserted text-editing instruction;

providing the prompt to the LLM and receiving a further annotated block of text;

generating a further prompt to the LLM including the further annotated block of text; and providing the further prompt to the LLM and receive the revised block of text.

15. The method of claim 10, wherein generating the prompt to the LLM comprises:

selecting the portion of the annotated block of text for inclusion in the prompt to the LLM, the selected portion including at least one inserted text-editing instruction and a defined amount of text preceding or following the at least one inserted text-editing instruction; and including only the selected portion of the annotated block of text in the prompt to the LLM.

16. The method of claim 15, wherein the selected portion of the annotated block of text is selected using a window defining a maximum number of sentences preceding the at least one inserted text-editing instruction and defining a maximum number of sentences following the at least one inserted text-editing instruction.

17. The method of claim 15, further comprising:

calculating an estimated token number for the annotated block of text; and responsive to the estimated token number exceeding a defined maximum token number, generating the prompt to the LLM using the selecting and including.

18. The method of claim 10, wherein generating the prompt to the LLM comprises:

parsing the received two or more text-editing instructions to identify one text-editing instruction that is indicated as a high priority instruction related to a respective selected text portion;

annotating the block of text to insert the high priority instruction relative to the respective selected text portion and include a defined annotation to indicate higher priority; and including the annotated block of text in the prompt to the LLM.

19. A non-transitory computer readable medium storing computer-executable instructions thereon, wherein the instructions are executable by a processing unit of a system to cause the system to:

receive two or more text-editing instructions related to one or more selected text portions in a block of text;

generate a prompt to a large language model (LLM) to generate a revised block of text, the prompt to the LLM including at least a portion of an annotated block of text, the annotated block of text including each text-editing instruction of the two or more text-editing instructions inserted into the block of text relative to each respective selected text portion of the one or more selected text portions;

provide the prompt to the LLM and receive a revised block of text; and output the revised block of text.

20. The non-transitory computer readable medium of claim 19, wherein the instructions are executable by the processing unit to further cause the system to:

provide, to a user device, a text-editing user interface (UI) for editing the block of text, the text-editing UI enabling user input of the two or more text-editing instructions related to the one or more selected text portions;

wherein the two or more text-editing instructions are received from the user device; and wherein the revised block of text is outputted to the user device.

21. The non-transitory computer readable medium of claim 19, wherein the instructions are executable by the processing unit to further cause the system to generate the prompt to the LLM by:

parsing the received two or more text-editing instructions to identify one text-editing instruction that is related to a respective selected text portion, the identified text-editing instruction containing a predefined keyword indicating the identified text-editing instruction should be applied elsewhere in the block of text;

identifying at least one other text portion in the block of text based on a match with the respective selected text portion that is related to the identified text-editing instructions;

annotating both the respective selected text portion that is related to the identified text-editing instructions and the identified at least one other text portion with the identified text-editing instruction; and including the annotated block of text in the prompt to the LLM.

22. The non-transitory computer readable medium of claim 19, wherein the instructions are executable by the processing unit to further cause the system to:

generate the prompt to the LLM including at least the portion of the annotated block of text, the prompt to the LLM also including an instruction to cause the LLM to further annotate the annotated block of text in accordance with at least one inserted text-editing instruction;

provide the prompt to the LLM and receive a further annotated block of text;

generate a further prompt to the LLM including the further annotated block of text; and provide the further prompt to the LLM and receive the revised block of text.

23. The non-transitory computer readable medium of claim 19, wherein the instructions are executable by the processing unit to further cause the system to generate the prompt to the LLM by:

selecting the portion of the annotated block of text for inclusion in the prompt to the LLM, the selected portion including at least one inserted text-editing instruction and a defined amount of text preceding or following the at least one inserted text-editing instruction; and including only the selected portion of the annotated block of text in the prompt to the LLM.

24. The non-transitory computer readable medium of claim 23, wherein the selected portion of the annotated block of text is selected using a window defining a maximum number of sentences preceding the at least one inserted text-editing instruction and defining a maximum number of sentences following the at least one inserted text-editing instruction.

25. The non-transitory computer readable medium of claim 19, wherein the instructions are executable by the processing unit to further cause the system to generate the prompt to the LLM by:

parsing the received two or more text-editing instructions to identify one text-editing instruction that is indicated as a high priority instruction related to a respective selected text portion;

annotating the block of text to insert the high priority instruction relative to the respective selected text portion and include a defined annotation to indicate higher priority; and including the annotated block of text in the prompt to the LLM.

\* \* \* \* \*